Patented Sept. 20, 1927.

1,643,222

UNITED STATES PATENT OFFICE.

WILHELM NEELMEIER, OF LEVERKUSEN, THEODOR NOCKEN, OF WIESDORF, NEAR COLOGNE-ON-THE-RHINE, AND WERNER REBNER, OF COLOGNE-MUHLHEIM, GERMANY, ASSIGNORS TO GRASSELLI DYESTUFF CORPORATION, OF NEW YORK, N. Y., A CORPORATION OF DELAWARE.

CHROMIABLE BROWN DISAZO DYESTUFFS.

No Drawing. Application filed April 22, 1926, Serial No. 103,961, and in Germany April 28, 1925.

Our invention consists in new disazodyestuffs which printed with chromium compounds upon cotton, yield exceedingly fast brown shades, and in the process of producing these compounds.

In the German Patents 51,504, 59,081, 58,415 there are described disazodyestuffs which are obtained by combining diazotized aromatic amino carboxylic acids such as aminobenzoic acid, aminophthalic acid, aminosalicylic acid etc. with 1-naphthylamine, diazotizing the aminoazo compound obtained and coupling with any desired coupling compound. If for the latter o-hydroxycarboxylic acids are used dyestuffs are obtained which produce brown shades when printed with chromium acetate. None of these products has, however, found technical application. Their solubility is in many cases quite insufficient for cotton printing and the second coupling with o-hydroxy carboxylic acids is furthermore very imperfect.

In using as first component in the above disazodyestuffs sulfonic acids of aromatic amino carboxylic acids as described in the German Patents 60,440 and 62,932, the products are even less applicable to cotton printing.

We have now found that dyestuffs exceedingly well suited for cotton printing are obtained if Cleve's acids, that is to say 1-naphthylamine-6- and 1-naphthylamine-7-sulfonic acids are used as middle components in the disazodyestuffs of the type described in the above German patents.

These new dyestuffs are of the general type:

in which R is the radicle of an aromatic amino carboxylic acid and includes their sulfonic acids, R' is the radicle of a Cleve's acid and R'' is the radicle of an ortho-hydroxycarboxylic acid. The process of producing these novel disazodyestuffs consists essentially in diazotizing aromatic aminocarboxylic acids, coupling the diazocompound obtained with a Cleve's acid, rediazotizing and coupling with an ortho-hydroxycarboxylic acid.

The use of Cleve's acids in the above type of disazodyestuffs produces quite an unexpected and exceedingly valuable effect. The solubility of the new products is excellent and the second coupling proceeds smoothly with superior yields which renders their technical production economically possible.

These novel dyestuffs are in form of their alkali metal salts dark reddish brown crystalline powders, they are soluble in water with usually an orange color and are soluble in concentrated sulfuric acid with blue to green colors. Printed on cotton with chromium acetate they yield brown shades having a high degree of fastness to washing, chlorine and light heretofore unknown in chromium printing. These new dyestuffs enable one to produce by chromium printing brown dyeings which up to now could only be produced with these fastness properties by the use of a few vat colors.

To further illustrate our invention the following examples are given, the parts being by weight.

*Example 1.*—18,1 parts of 4-aminophthalic acid are diazotized in the usual manner and coupled with a solution of 22,3 parts of 1-naphthylamine-6-sulfonic acid in 500 parts of water and the solution made organic acid by neutralizing the mineral acidity with sodium acetate. The reaction product is stirred for several hours until the coupling is completed.

The reaction mass is then heated to dissolve the dyestuff, treated with hydrochloric acid, in amount sufficient to render the reaction product acid to congo paper; the aminoazocompound crystallizes out on cooling. It is filtered off and then dissolved in 250 parts of hot water made alkaline with a little caustic soda. 75 parts of a 10 per cent. sodium nitrite solution are then added, the mass cooled to 5° C. and at once 50 parts of concentrated hydrochloric acid added. The diazocompound crystallizes out, it is filtered off in vacuo and added to a solution of 15,2 parts m-cresotinic acid in 150 parts water containing 30 parts of soda ash, and cooled to—3 to 0° C. The mass is stirred for several hours, then heated to 80° C. and salted out with sodium chloride. The dyestuff is then filtered off and dried in the usual manner. It is a reddish-brown powder, soluble in water with an orange color and soluble in concentrated sulfuric acid with a green color. The most probable formula for the free dyestuff is:

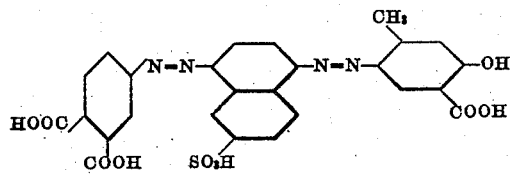

Printed with chromium acetate on cotton it produces beautiful brown shades of superior fastness to chlorine, washing and light. Afterchromed on wool it produces a reddish brown dyeing fast to milling and particularly fast to light.

*Example 2.*—233 parts 3-amino-5-sulfo-2-hydroxy-benzoic acid are diazotized in the usual manner and coupled in acetic acid solution with 223 parts of 1-naphthylamine-6-sulfonic acid. The reaction mass is made soda alkaline and the monoazodyestuff salted out, it is then filtered off and redissolved in 3000 parts of water. The mass is cooled to 0° C. and 69 parts of sodium nitrite and 500 parts 19,5° Bé. hydrochloric acid added at once. The diazo-compound crystallizes out; it is filtered off, sludged with 1000 parts ice-water and a neutral solution of 150 parts of salicylic acid in 200 parts water is added. After cooling to —5° C. there are added quickly 300 parts of soda ash and 150 parts 40° caustic soda solution. The coupling is shortly finished. The dyestuff crystallizes directly from the reaction mass and is obtained in substantially pure form by filtering it off. It is, when dry, a reddish-brown crystalline powder, soluble in water with an orange red color and soluble in concentrated sulfuric acid with a blue color. It has in the free state most probably the formula

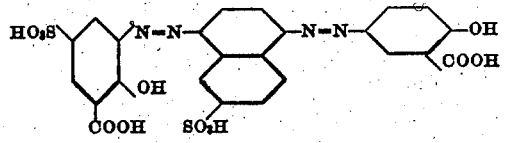

Printed with chromium compounds on cotton it yields a reddish-brown of good light, washing and chlorine-fastness properties which compare favorably with dyeings obtained with any known Indanthrene color. Wool is dyed directly orange brown shades which by afterchroming are changed to reddish-brown of superior light and milling fastness.

We claim:—

1. In process of producing brown disazo-dyestuffs suitable for cotton printing with chromium compounds, the steps comprising coupling an aromatic diazocarboxylic acid with a Cleve's acid, rediazotizing the monoazocompound formed and coupling with an ortho-hydroxy-carboxylic acid.

2. In process of producing brown disazo dyestuffs suitable for cotton printing with chromium compounds, the steps comprising coupling an aromatic diazo-carboxylic acid with 1-naphthylamine-6-sulfonic acid, rediazotizing the monoazo compound formed and coupling with an ortho-hydroxy-carboxylic acid.

3. In the process of producing a brown disazodyestuff suitable for cotton printing with chromium compounds, the steps comprising coupling 3-diazo-5-sulfo-2-hydroxy-benzoic acid with 1-naphthylamine-6-sulfonic acid, rediazotizing the monoazo compound formed and coupling with salicylic acid.

4. As new products disazodyestuffs of the general formula $$R-N=N-R'-N=N-R''$$

in which R is the radicle of an aromatic amino-carboxylic acid, R' the radicle of a Cleve's acid and R'' the radicle of an ortho-hydroxy-carboxylic acid, which dyestuffs produce when printed with chromium compounds on cotton exceedingly fast brown shades.

5. As new products disazodyestuffs of the general formula

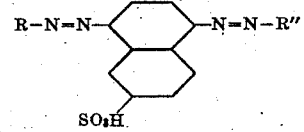

in which R is the radicle of an aromatic amino-carboxylic acid and R'' the radicle of an ortho-hydroxy-carboxylic acid, which dyestuffs produce when printed with chromium compounds on cotton exceedingly fast brown shades.

6. As a new product the disazodyestuff having in the free state most probably the formula

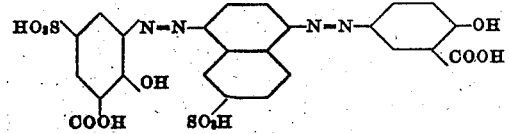

which is substantially identical with the product obtained by coupling 3-diazo-5-sulfo-2-hydroxy-benzoic acid with 1-naphthyl-amine-6-sulfonic acid, rediazotizing the monoazodyestuff formed and coupling with salicylic acid, which in form of its alkali metal salt is a reddish-brown powder, soluble in water with an orange-red color, soluble in concentrated sulfuric acid with a blue color and when printed on cotton with chromium compounds yields exceedingly fast brown shades.

In testimony whereof we have hereunto set our hands.

WILHELM NEELMEIER.
THEODOR NOCKEN.
WERNER REBNER.